Figure 1:
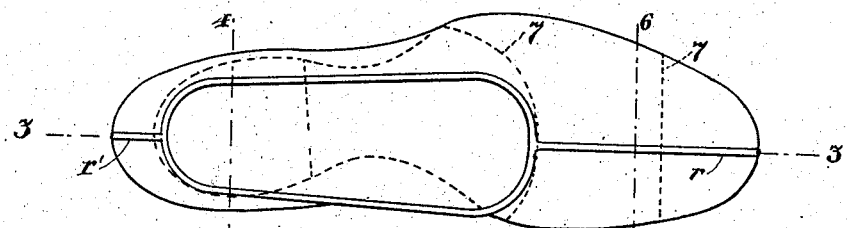
Figure 2:
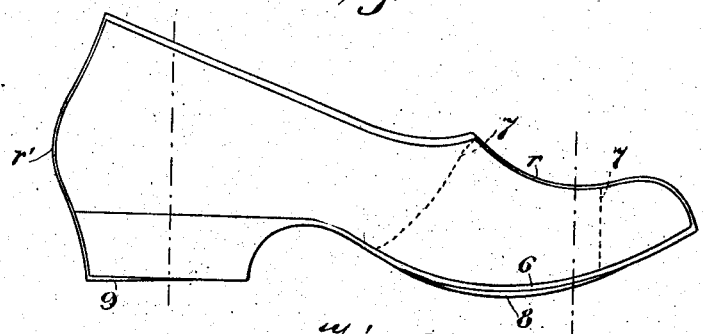
Figure 3:
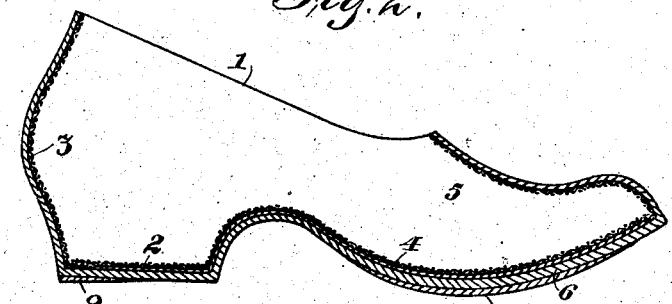
Figure 4:
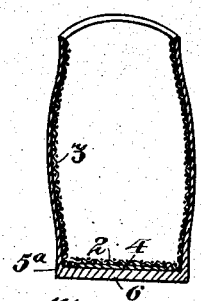
Figure 5:
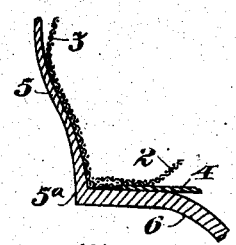
Figure 6:
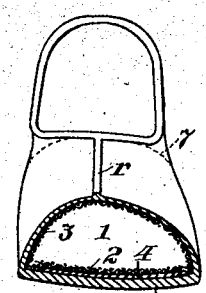

No. 823,928. PATENTED JUNE 19, 1906.
M. C. CLARK.
PROCESS FOR MANUFACTURE OF VULCANIZED FOOTWEAR.
APPLICATION FILED OCT. 28, 1905.

3 SHEETS—SHEET 1.

WITNESSES:
Robert Head
R. B. Cavanagh

INVENTOR
Maurice C. Clark
BY
Clifford Peel
ATTORNEYS

No. 823,928. PATENTED JUNE 19, 1906.
M. C. CLARK.
PROCESS FOR MANUFACTURE OF VULCANIZED FOOTWEAR.
APPLICATION FILED OCT. 28, 1905.

3 SHEETS—SHEET 2.

WITNESSES:
Robert Head.
R. B. Cavanagh.

INVENTOR
Maurice C. Clark
BY
Gifford Pinchot
ATTORNEYS

No. 823,928. PATENTED JUNE 19, 1906.
M. C. CLARK.
PROCESS FOR MANUFACTURE OF VULCANIZED FOOTWEAR.
APPLICATION FILED OCT. 28, 1905.

3 SHEETS—SHEET 3.

WITNESSES:
Robert Head
R. B. Cavanagh

INVENTOR
Maurice C. Clark
BY
Clifford Price
ATTORNEYS

UNITED STATES PATENT OFFICE.

MAURICE C. CLARK, OF PROVIDENCE, RHODE ISLAND, ASSIGNOR TO MARVEL RUBBER COMPANY, A CORPORATION OF RHODE ISLAND.

PROCESS FOR MANUFACTURE OF VULCANIZED FOOTWEAR.

No. 823,928.    Specification of Letters Patent.    Patented June 19, 1906.

Application filed October 28, 1905. Serial No. 284,842.

*To all whom it may concern:*

Be it known that I, MAURICE C. CLARK, a citizen of the United States, and a resident of Providence, county of Providence, and State of Rhode Island, have invented a new and Improved Process for the Manufacture of Vulcanized Footwear, of which the following is a specification.

Heretofore it has been well known that the vulcanizing of rubber articles of footwear in molds would be preferable to vulcanizing them in an ordinary vulcanizing-furnace for two reasons: in the first place, because the quality of the rubber in the mold-vulcanized article is in many respects preferable to that of the non-mold-vulcanized article. In the second place, the mold performs the function of forming and marking the exterior of the article much more cheaply and better than it can otherwise be done. Notwithstanding the above knowledge I believe that at the present time mold-vulcanized footwear is not an article of commerce, the reason being that certain practical difficulties have existed which the attempts heretofore made have failed to overcome.

The object of this invention is to provide a process whereby such difficulties may be overcome, and thus solve the problem of the commercial manufacture of mold-vulcanized footwear. Heretofore two methods have been attempted for solving this problem as follows: first, by a mold confining the material between rigid surfaces inside and outside; second, by a mold confining the material between a rigid surface outside and air-pressure inside. According to the first of these systems the patent to Wren, No. 311,458, dated January 27, 1885, confined the shoe within an exterior mold in two parts divided substantially on the central vertical plane. The Doughty patent, No. 404,265, May 28, 1889, also employed a two-part mold, the division-line between which was at the widest part of the shoe throughout from toe to heel. An insurmountable obstacle to the success of these devices has been that as soon as they were applied to the molding of a textile-lined shoe the advance of the mold parts toward each other would cause the lining to creep over the surface of the last and form a fold projecting out between the edges of the mold parts, at which fold the lining would be cut by being caught between the mold parts. According to the second of these systems were the patent to Weeks, No. 233,385, October 19, 1880, and the Doughty patent, No. 722,822, dated March 17, 1903. By my process I not only obviate the cutting of the lining above referred to, but may, if desired, so dispose the rubber compound in the article and the joint between sole and upper as to benefit the article of footwear in other respects.

Figure 9:
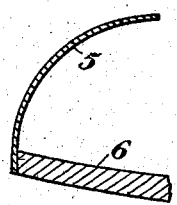
Figure 10:
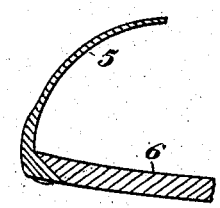
Figure 11:
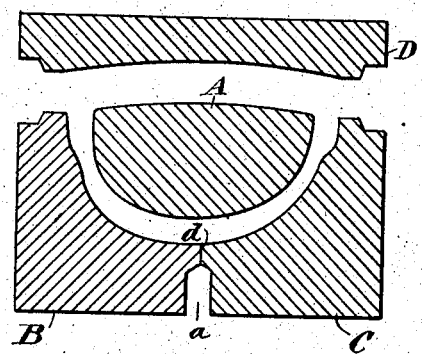
Figure 12:
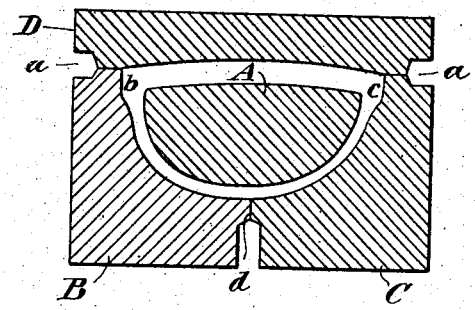
Figure 13:
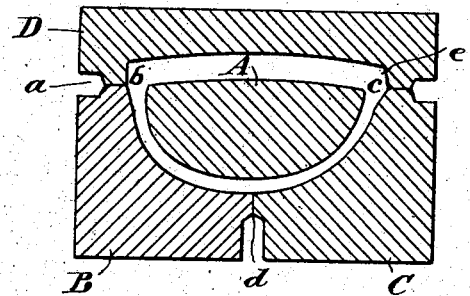
Figure 14:
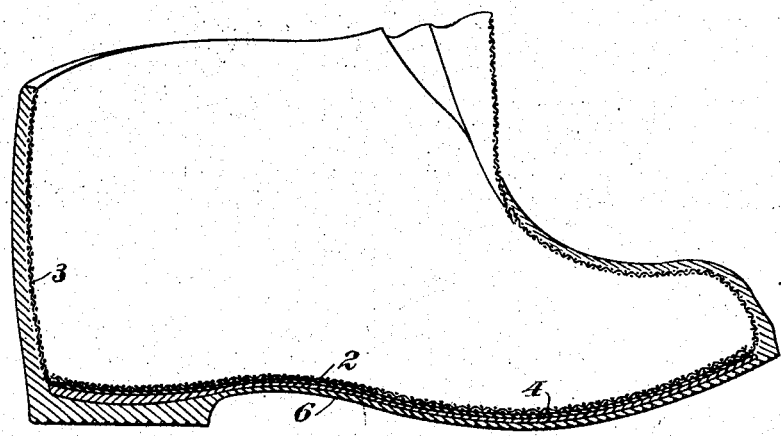

In the accompanying drawings, Figures 1 to 10, inclusive, represent a completed shoe and the steps of my process of building the shoe with certain modifications. Figs. 11, 12, and 13 represent the step of molding and vulcanizing. Fig. 14 is a vertical sectional view showing a shoe or boot made by my improved process, the shoe or boot being of the type commonly known as a "lumberman's" boot.

Under the pressure of the side molds the tendency of the compound in the upper is to flow not merely down the edge of the sole, but over the top thereof toward the edge of the filling-sole 4.

In this specification and claims I use the term "rigid last" to signify a last in which the surface next the boot or shoe is of substantially rigid material, such as wood or metal, in contradistinction to mere air-pressure, and I use the term "rigid pressure" to signify substantially such pressure as is exerted by such a rigid last in opposition to a mold.

The shoe or boot may be built upon the last as follows: Upon the last 1 is first placed the insole 2, next the lining 3, with its lower edge lapping the insole, as shown, next the filling-sole 4, next the upper 5, and next the outsole 6.

The lining 3 and insole 2 are composed of textile material coated on the outside with rubber. They are preferably partially vulcanized before being built upon the last, although they may be built upon the last in unvulcanized condition. This partial vulcanization may be performed by subjecting the coated textile fabric for the lining and insole to a lower degree of heat (say 150°) or for a shorter length of time than would ordinarily be used for the vulcanization of the rubber compound. The effect of this preliminary partial vulcanization of the lining material is that the creeping on the surface of the last under the outside-mold pressure is less. Moreover, the partial vulcanization has a tendency to prevent the substantial pressure between the last and outside mold from striking or forcing the outside rubber compound of the upper through the textile material of the lining so as to coat the inner surface thereof with the rubber compound.

The filling-sole 4 is of textile material coated on both sides with unvulcanized rubber compound. The upper 5 is a sheet of unvulcanized rubber compound which is preferably slightly thicker than desired in the finished article, because the pressure of the molds has a tendency to thin it by crowding its material toward and to some extent out at the edges of the mold parts. The upper in the completed article is preferably gradually thickened at $5^a$ as it approaches the sole all the way round the shoe. For the production of this thickening dependence may be placed upon the crowding or flowing of the rubber compound toward the edge above referred to or the unvulcanized sheet may be made thicker at that point before being built on the last.

Figure 7:
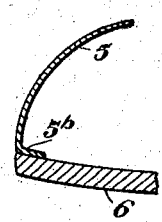

The outsole 6 may be of ordinary construction and size. If so, in building the shoe the lower edge of the upper will be turned under the last, as shown in Fig. 7 at $5^b$, and the outsole will be wide enough to overlap it to the extreme edge of the sole-space in the mold. I prefer, however, to make the sole of less than the full width or length and to build as shown either in Fig. 9 or Fig. 10, wherein the upper extends down into the sole-space of the mold, so that the material of the upper shall in the finished article constitute the outer edge of the sole. In Fig. 9 the edge of the unvulcanized sole is shown as abutting against the side of the unvulcanized upper; but in Fig. 10 the upper is shown as containing an extension under the sole and forming a beveled joint therewith. An advantage of building as shown in Figs. 9 or 10 is that in the completed article the superior composition (containing a larger percentage of real rubber and being softer when vulcanized) of the upper extends all the way down to the bottom of the shoe and the inferior composition of the sole is confined to the middle portions of the sole, presenting a superior quality of material at the edges of the sole, where the joint occurs with the upper and the cracking tendency of the upper is greatest and where the sole receives most blows in wear.

In the building of the shoe above described the upper is a separately-rolled sheet of rubber compound from the rubber-coated lining. This, while preferable, is not essential, because the sheet constituting the upper may be rolled onto the coated lining before the lining is applied and the two applied together. In this case preferably the coated lining will be partially vulcanized, as above described, before the unvulcanized sheet constituting the upper is rolled onto it.

Figure 8:
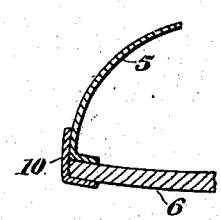

In building the shoe or boot having a lining of textile material the upper may be made of low-cost rubber compound and reinforced in places where the greatest wear comes. For example, as shown in Fig. 8, the upper proper may extend between the last and a sole of less than final width and length, a separate strip 10 of superior unvulcanized rubber compound being applied overlapping the edge of the sole and lower part of the upper all round the shoe. Also after the building of the shoe in any of the ways above described a vamp-piece of fine grade of rubber compound may be applied, Figs. 1 and 2 in dotted lines, forming a zone of superior rubber extending over the instep from sole to sole and from the top of the vamp a portion of the distance toward the toe. It thus covers the portions of the rubber that are most liable to wrinkle and to crack. Again, the ball of the sole may be covered by a thin piece of fine-grade rubber compound, as indicated at 8 in Figs. 2, 3. Again, the rear portion of the heel may also be covered by a thin piece of fine-grade rubber compound, as indicated at 9, Fig. 2. Again, the superior compound of the upper forming the edge of the sole may after vulcanization extend below the lower level of the sole entirely around the shoe, as shown in Fig. 10, so as not only to relieve the bottom of the sole from wear, but also to present a bead or series of projections of comparatively soft and superior rubber which will prevent the wearer from slipping.

After building the shoe upon the last in the manner above described it, still containing the last, is placed within the mold for purposes of vulcanization, dependence being placed upon the form of the interior of the mold to give the final form and finish to the completed article and impress upon it any lines or marks, such as corrugation of the sole, &c.

The molding step of the process is as follows: Reference is made to the diagrams, Figs. 11, 12, and 13, in which A represents the inverted last (of solid or rigid material, such as wood or metal, in contradistinction to gaseous material, such as air) with shoe built upon it, as above described, at a cross-section at about the ball of the foot. B and C are two side parts of the mold having motion toward and from each other. D is the sole-mold having motion toward and from the two side molds. According to the preferable method the shoe and last are supported slightly above the vulcanizing position (about one-eighth of an inch above) and the side molds B and C are brought together, as shown in Fig. 11. Then the sole-mold is advanced so as to press the shoe and its last down into vulcanizing position, as shown in Fig. 12.

By this mode of operation as the side molds are brought together the presence of the space $a$ inside their edges prevents them from having any substantial chafing action upon the shoe, which would cause the lining to creep on the last, so as to form a fold in the lining between the edges of the mold at the junction of the side molds. The final motion from the position of Fig. 11 to that of Fig. 12, by which the last and shoe are forced down into the side molds, is so slight as either not to produce any substantial creeping of the lining on the last at the sides of the shoe or if such creeping occurs any resulting fullness of the lining is substantially at the junction between the lining and the sole, where it is substantially negligible. It will be observed that the upper edges of the side molds B and C are slightly beveled, so as to leave spaces $b$ $c$ adjacent to the edges of the sole. The rubber forced into these spaces by the compression of the upper (or placed there in building the shoe, as above described) forms the thickening of the upper adjacent to the edges of the sole, above referred to and shown in Figs. 3 to 6. The molds being heated to vulcanizing temperature, as soon as their heat is brought to bear upon the unvulcanized rubber of the upper it is almost immediately softened to such an extent that it tends to flow away from the regions of greatest pressure toward the regions of less, so as to fill up any cavities provided by the mold. It will be understood, of course, that Figs. 11, 12, and 13 are merely diagrammatic and the spaces $a$, $b$, and $c$ are exaggerated in size for convenience of illustration. In lieu of employing the preliminary position or movement illustrated in Fig. 11 the closing of the molds may, though less desirably, be accomplished all at once, as shown in Fig. 13—that is to say, the last and shoe A may be held in its final vulcanizing position, while the side molds B and C and sole-mold D are all closed at once. In this case for the prevention of the formation of a fold of the lining between the side molds B C dependence must be had upon the fact that the final junction of the molds B and C occurs at a line $d$, from which the curvature of the upper on each side is sufficiently abrupt, so that the molds move only a very short distance from the time that they come in contact with the surface of the upper until they come in contact with each other, and therefore there is very little tendency to cause the lining to creep upon the surface of the last toward the line $d$. Such creeping tendency is also decreased if the lining has received the preliminary partial vulcanization above referred to. In the vulcanized article produced by the molds of Figs. 11 and 12 the upper inclusive of the preferable extra thickness thereof produced in the spaces $d$ and $c$ will overlap the edges of the sole, so that practically the upper extends down to the ground, or, in other words, the material of the upper extends down to and around the edges of the sole, and this I regard to be a great advantage, because a strong smooth joint is formed at the point of juncture of the upper and the sole that is not liable to split or give way when the shoe is in use and also produces a sole that will wear better at the edges. If the material of the upper extends below the sole, it may serve to prevent slipping and to relieve the middle of the sole from wear. If, however, it be desired to have the upper abut against the top of the sole, it may be done by so constructing the mold parts that when in their final position they will be as represented diagrammatically in Fig. 13, wherein the sole occupies a space $e$ sunk into the face of the mold D and extending laterally to the outside of the spaces $b$ $c$.

In case the heel or outside is built up of more than one layer or tap, as in the case of a boot or a lumberman's shoe, (shown in Fig. 14,) the material of the upper will be extended to the bottom of the sole and heel inclusive of any tap that the sole or heel may contain.

Having thus described my invention, I claim as new and desire to secure by Letters Patent—

1. The process of manufacturing a molded vulcanized article of footwear which consists in vulcanizing the same and during such vulcanization applying pressure to the article in such manner that the compound of the upper is pressed beyond the edge of the sole by the side molds and down onto the outer surface of the sole by the sole-mold.

2. The process of manufacturing a molded vulcanized article of footwear, which consists of vulcanizing the same and then pressing the compound of the upper around and over the edge of the sole in toward the center of such sole.

3. The process of manufacturing a molded vulcanized article of footwear containing a lining of textile material which consists in applying to the lining a coating of rubber compound, then partially vulcanizing the coating, then applying thereto an exterior coating of rubber compound and vulcanizing the same while under substantially rigid pressure between the last and the mold.

4. The process of manufacturing a molded vulcanized article of footwear containing a lining of textile material, which consists in applying the initial pressure of the mold to the sides of the upper succeeded by pressure upon the top thereof.

5. The process of manufacturing a molded vulcanized article of footwear which consists in closing the sides of a mold upon said article while in partially-inserted position and subsequently forcing the article home to its final position.

6. The process of manufacturing a molded vulcanized article of footwear containing a lining of textile material which consists in partially vulcanizing the lining, applying thereto an exterior rubber compound and vulcanizing the same while under substantially rigid pressure upon the upper directed toward the sole.

7. The process of manufacturing a molded vulcanized article of footwear containing a lining of textile material which consists in vulcanizing the same and applying substantially rigid pressure to cause the material to flow toward and beyond the lower corner of the sole and then applying pressure to press the material into the sole.

8. The process of manufacturing a molded vulcanized article of footwear containing a lining of textile material turned in on top of the sole, which consists in vulcanizing the same and applying substantially rigid pressure to cause the compound of the upper to be pressed on top of and down around the edge of the sole.

In testimony whereof I have hereunto signed my name in the presence of two subscribing witnesses.

MAURICE C. CLARK.

Witnesses:
R. B. CAVANAGH,
W. A. PAULING.